(12) United States Patent
Mankame et al.

(10) Patent No.: US 8,857,273 B2
(45) Date of Patent: Oct. 14, 2014

(54) MECHANICAL OVERLOAD PROTECTION UTILIZING SUPERELASTIC SHAPE MEMORY ALLOY ACTUATION

(75) Inventors: Nilesh D. Mankame, Ann Arbor, MI (US); Richard J. Skurkis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 171 days.

(21) Appl. No.: 13/560,878

(22) Filed: Jul. 27, 2012

(65) Prior Publication Data

US 2014/0026679 A1    Jan. 30, 2014

(51) Int. Cl.
*G01D 1/00* (2006.01)
*G01L 1/00* (2006.01)
*G01L 5/00* (2006.01)

(52) U.S. Cl.
USPC .................................. 73/862.53; 73/862.381

(58) Field of Classification Search
USPC ........................................ 73/862.53, 862.381
See application file for complete search history.

(56) References Cited

U.S. PATENT DOCUMENTS

2012/0297763 A1* 11/2012 Mankame et al. .............. 60/527
2014/0026554 A1*  1/2014 Browne et al. ................. 60/527

* cited by examiner

*Primary Examiner* — Lisa Caputo
*Assistant Examiner* — Jamel Williams

(57) ABSTRACT

An actuation assembly adapted for driving a load, and protecting against overload conditions, includes an actuator defining a stroke, and a resistive member, such as a superelastic shape memory alloy spring, drivenly coupled to the actuator, so as to be displaced over the stroke when an overload condition exists, and defining a non-linear force versus displacement profile.

14 Claims, 3 Drawing Sheets

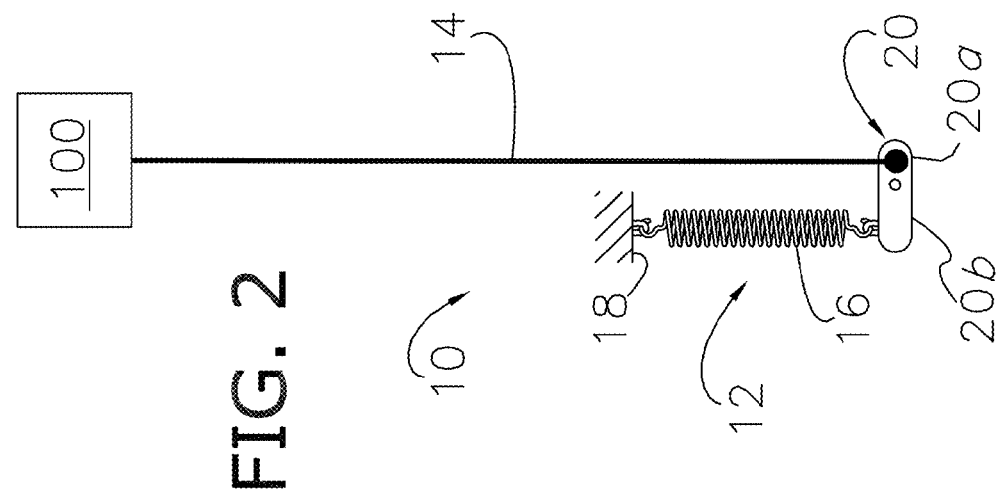
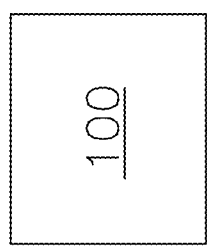
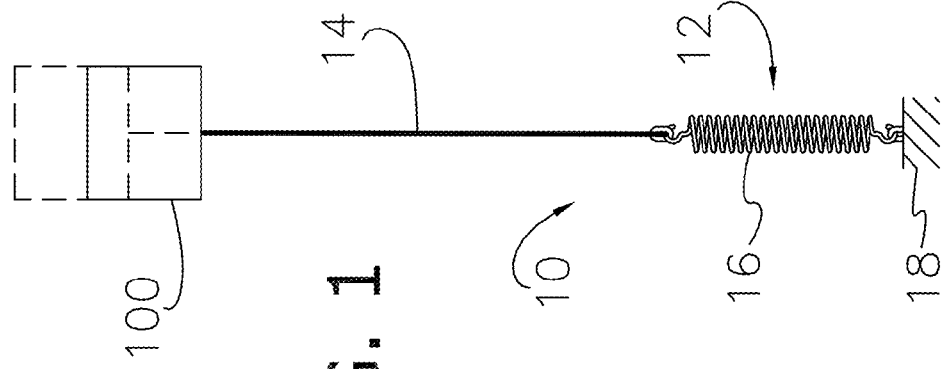

MECHANICAL OVERLOAD PROTECTION UTILIZING SUPERELASTIC SHAPE MEMORY ALLOY ACTUATION

BACKGROUND OF THE INVENTION

1. Field of the Invention

The present disclosure generally relates to devices for and methods of protecting an actuator against overload conditions; and more particularly, to a device for and method of overload protection that utilize superelastic (also known as "pseudoelastic") shape memory alloy based overload protection systems to accomplish the same.

2. Discussion of Prior Art

Active material actuators, such as shape memory alloy wires, are generally protected from mechanical overload by the use of mechanical springs or electrical control schemes to avoid damage to the actuators when the output load exceeds a recommended limit. Both of these measures, however, present various concerns in the art. For example, linear mechanical springs needed for overload protection tend to be bulky because of the conflicting requirements of high force threshold for the overload function necessary to enable normal operation, and low stiffness to restrict the maximum stress experienced by the actuator when the overload protection system is activated. The electrical/control schemes are more versatile, but they increase system cost.

BRIEF SUMMARY OF THE INVENTION

Responsive to these and other concerns, the present invention recites a device for and method of overload protection that utilizes a superelastic shape memory alloy element to accomplish the same. As an overload protection device, the invention offers a secondary path for work output, when the system experiences a mechanical overload event. A mechanical overload event is deemed to have occurred when the motion of the end of the actuator that is attached to the output load is restrained in a manner that requires significantly higher force for continued motion than is typical for the system or application. Mechanical jamming of the output load itself or of any component that mechanically couples the actuator to the output load is a typical example of a mechanical overload event. Under this circumstance, the force needed to break the system free of the jammed state can be significantly greater than the force required for normal operation of the system. This force may exceed the design force level for the actuator. For an actuation system where the power supplied to the actuator is turned off only when the actuator has completed its entire stroke, a mechanical overload event can cause the actuator to exceed its design force level thereby leading to permanent deterioration of the actuator performance. By employing a superelastic or normally Austenitic shape memory alloy element based mechanical overload protection system, the invention is useful for offering a non-linear overload protection system. The invention uses the sharp reduction in modulus due to the onset of stress-induced Austenite to Martensite transformation in the super-elastic SMA element to provide a high overload force threshold and a low post-overload stiffness without significantly increasing the bulk/size of the actuator. Although a shape memory SMA based primary actuator provides a natural context for describing the use of a super-elastic SMA based overload protection system, it should be noted that the proposed overload protection system can be used with any primary actuator that shares the high overload force threshold and low post-overload stiffness characteristics of SMA wire based actuators.

In general, an actuation assembly adapted for driving a load, and preventing overload conditions is recited. The assembly includes an actuator drivenly coupled to the load, defining a stroke, and presenting a maximum actuation force and structural capacity, and a mechanical resistive member drivenly coupled to the actuator opposite the load. The resistive member is operable to be displaced over the entire stroke of the actuator. The resistive member behaves like a rigid mechanical coupling as long as the force in the actuator is less than a design threshold force. Under these circumstances, any force developed by the actuator is effective to do work on the output load. These represent the normal operating conditions for the system—there is no mechanical overload and the overload protection system is not activated. When the force in the actuator exceeds the design threshold force, which is typically chosen to be greater than the maximum force required to drive the output load under normal operating conditions, the overload protection system is activated. The proposed overload protection system uses a resistive member with a non-linear force-deflection characteristics: the stiffness is high for forces lower than the design threshold and comparatively much lower when the force is greater than the design threshold force. Further recited and supported by the present disclosure is a resistive member comprising superelastic shape memory alloy. In this case, the high initial stiffness of the resistive member constituting the overload protection system is derived from the geometry of the SE-SMA element and the modulus of the material in its Austenitic phase. The low stiffness for forces greater than the design threshold force is derived from the low modulus associated with the stress-driven, solid-state, transformation from the Austenitic to the Martensitic phases.

The disclosure may be understood more readily by reference to the following detailed description of the various features of the disclosure and the examples included herein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 1 is an elevation of an active material actuator having drivenly attached thereto an overload protection device comprising a superelastic shape memory alloy spring, in accordance with a preferred embodiment of the invention;

FIG. 1a is an elevation of the actuator shown in FIG. 1, wherein an overload condition exists and the SE-SMA spring has been stretched in response;

FIG. 2 is an elevation of an active material actuator having drivenly attached thereto an overload protection device comprising a superelastic shape memory alloy spring and lever arm, in accordance with a preferred embodiment of the invention;

DETAILED DESCRIPTION OF THE INVENTION

Figure 3:
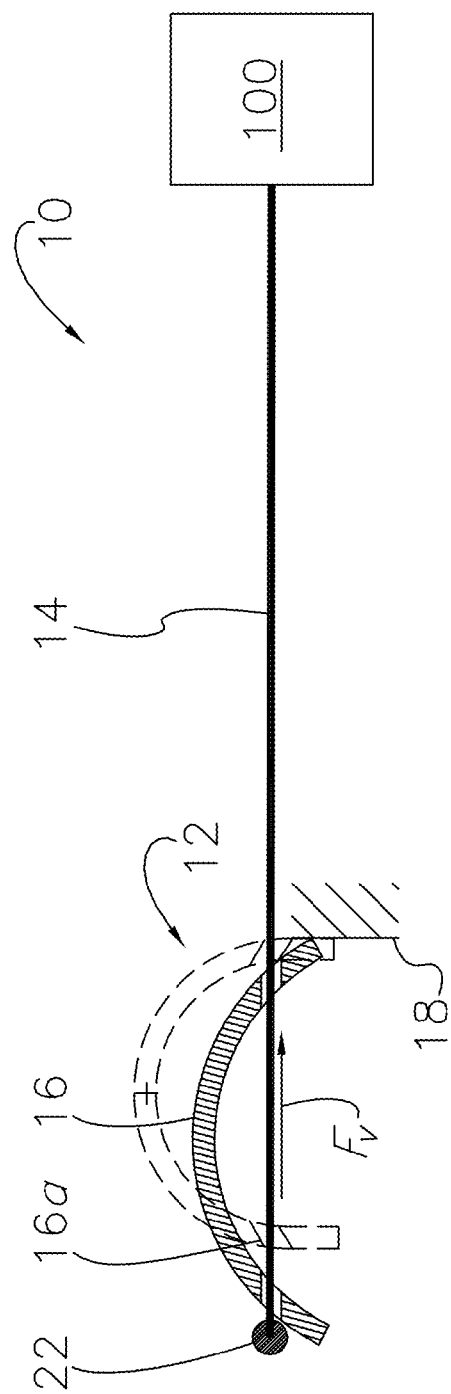
FIG. 3 is an elevation of an active material actuator having drivenly attached thereto an overload protection device including a superelastic shape memory alloy element bent into a resisting member, in accordance with a preferred embodiment of the invention.
Figure 4:
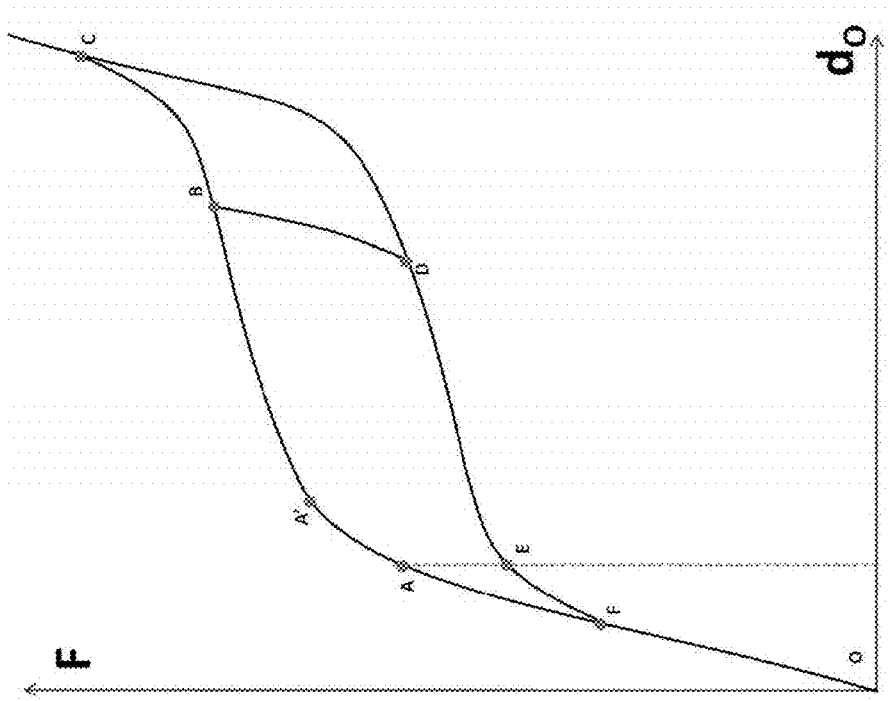
FIG. 4 depicts a force versus displacement profile.

Referring to FIGS. 1-3, the present invention concerns a novel actuation assembly 10 comprising an overload protection device 12 and actuator 14. The assembly 10 is configured to drive a load 100 and provide mechanical overload protection when the load 100 is greater than the design threshold force specified for the actuator 14. Many active materials based actuators (e.g. SME-SMA wires) possess a small useful stroke. Therefore, in mechanical overload protection systems for such actuators, the overload protection system must not detract from the actuator's stroke under normal operating conditions. At the same time, the overload protection systems must be capable of allowing the actuator to complete its entire stroke while limiting the maximum force experienced by the actuator to a safe value when a mechanical overload event occurs. Conventional mechanical overload protection systems accomplish this using pre-loaded linear springs. The pre-load in the springs can be set when the springs are manufactured or it can be accomplished by imposing mechanical contact constraints e.g. a pre-load screw that keeps the spring deformed by exerting the specified pre-load force on the spring. The resulting overload protection system has high stiffness until the force in the actuator exceeds the pre-load force level; beyond this point, the overload protection system exhibits a stiffness corresponding to the native stiffness of the linear spring. This leads naturally to conflicting requirements on the design of the overload protection system. A high pre-load force requires either an overload spring with a high native stiffness or an overload stiffness spring with low native stiffness that is pre-loaded through a significant part of its useful deflection range to achieve the high preload force. The former approach leads to a compact design for the overload protection system but results in high maximum force levels in the actuator during a mechanical overload event. In contrast, the latter approach can result in much lower maximum force levels in the actuator during a mechanical overload event but it leads to an unwieldy overload protection system due to the large undeflected size of the overload protection spring. The present invention overcomes the above trade-off inherent in the design of mechanical overload protection systems based on linear springs by using a non-linear spring as the basis of the overload protection system. Further, the non-linearity of the proposed non-linear overload spring arises from an intrinsic property of SE-SMA material that the spring is made from. The modulus of SE-SMA material reduces significantly (e.g. by a factor of 3) when it undergoes a stress-driven, solid state transformation from an Austenitic to a de-twinned Martensitic phase. This material behavior can be exploited to create a non-linear spring for a compact overload protection system. As in the conventional overload protection systems, a mechanical constraint can be used to adjust the pre-load in the non-linear spring to the desired design threshold force. The proposed system reduces the stress within the actuator 14 after a mechanical overload event has initiated the overload protection system, and offers minimal reduction in useful stroke during normal operation of the system. Thus, in general, the invention presents a device for and method of providing overload protection to an actuator 14, including but not limited to active material actuators, that employ superelastic shape memory based resistive member 16 that effects a non-linear force versus displacement profile (see, e.g., FIG. 4). The low modulus of the SE-SMA material is limited to the phase transformation event which can correspond to about 4-8% strain; beyond this the modulus reverts back to a high value. Accordingly, the low stiffness offered by the overload protection spring made of an SE-SMA material can persist only over a stroke that corresponds to the 4-8% material strain. This is sufficient for most active material based actuators (e.g. SME-SMA wires, piezo actuators, etc). Actuators that have a larger stroke will need to use a transmission between the overload protection system and the actuator itself that transforms the full stroke of the actuator to the maximum strain that can be accommodated by the SE-SMA overload spring corresponding to its low stiffness state.

The invention is suitable for use by any actuator 14 that defines a stroke, presents a maximum actuation force, and is susceptible to overloading. In an automotive or commercial setting, for example, the actuation assembly 10 may be used to drive at least one exterior vent cover (not shown) susceptible to obstruction by snow, ice, mud, or the like. As previously mentioned, the present invention is particularly suited for use with active material actuators 14, as such term is defined below. The following description of the preferred embodiments is merely exemplary in nature and is in no way intended to limit the invention, its application, or uses.

As used herein the term "active material" is defined as any of those materials or composites that exhibit a reversible change in fundamental (i.e., chemical or intrinsic physical) property when subjected to an activation signal. Suitable active materials for use as an actuator include but are not limited to shape memory materials that have the ability to remember their original at least one attribute such as shape, which can subsequently be recalled by applying an external stimulus. Exemplary shape memory materials for use as actuators include shape memory alloys (SMA), shape memory polymer (SMP), shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like. Again, however, with respect to the overload protection device 12, a suitable active material presenting a stress-induced high to low modulus/viscosity/plasticity transformation, such as a superelastic SMA, or active shearing fluid, is applied in the present invention.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. Stress induced phase changes in SMA known as superelasticity (or pseudoelasticity) refers to the ability of SMA to return to its original shape upon unloading after a substantial deformation in a two-way manner. Application of sufficient stress when an SMA is in its Austenitic phase will cause it to change to its lower modulus Martensitic phase in which it can exhibit up to 8% of superelastic deformation. Removal of the applied stress will cause the SMA to switch back to its Austenitic phase in so doing recovering its starting shape and higher modulus, and dissipating energy. More particularly, the application of an externally applied stress causes martensite to form at temperatures higher than $M_s$. The macroscopic deformation is accommodated by the formation of martensite. When the stress is released, the martensite transforms back into austenite and the SMA returns back to its original shape. Superelastic SMA can be strained several times more than ordinary metal alloys without being plastically deformed, however, this is only observed over a specific temperature range, with the largest ability to recover occurring close to $A_f$.

Returning to the configuration of the present invention, the overload protection device 12 is configured to provide an secondary work output path (FIG. 1a) for the actuator 14, so as to prevent or mitigate a mechanical overload condition (e.g., wherein tensile stress within a wire actuator exceeds its tensile strength). The inventive device 12 includes a resistive member 16 that presents an initial deformation required force not greater than the maximum actuation force, and offers a non-linear relationship between force and displacement (or deformation). That is to say, the amount of force that is required to displace the member 16 is not proportional to the displacement over the stroke, as is the case with conventional springs, whose k-values are presented by the slope of their linear relationship. More preferably, the resistive member 16 offers a drop in force during the stroke; and most preferably, the resistive member 16 offers a decreasing force versus displacement profile over the entire stroke. Finally, once the stroke is complete and the actuator 14 is de-actuated, the preferred resistive member 16 is configured to autonomously return to its original condition, so as to reset the overload protection device 12.

In a first embodiment, the resistive member 16 presents a spring formed at least in part by, and more preferably entirely of normally superelastic shape memory alloy (FIGS. 1-2). That is to say, the shape memory alloy presents an Austenitic finish temperature less than the lowest anticipated operating temperature of the actuator 14 (e.g., less than −30° C. for automotive settings). Based on the manner of actuation (linear, angular, etc.), the application and/or device geometry and functionality, the member 16 may present any spring configuration, including but not limited to extension (or helical), compression, torsion, and leaf springs. In FIGS. 1-2, the exemplary member 16 presents an extension spring, and the actuator 14 presents a shape memory wire, wherein the term "wire" shall be construed to include other tensile structures such as cables, braids, chains, etc., that perform equivalently.

The extension spring 16 is connected in series with the wire 14 at a first end, and with fixed structure 18 at the opposite end, so as to be drivenly coupled thereto. The Austenitic spring 16 is preferably stretched (i.e., "displaced") to a point where its applied preload corresponds to the load level where it is appreciated that the actuator 14 would begin to experience excessive stress if blocked. As a result, activation of the actuator 14 will first apply a force trying to manipulate the load 100, but if the force level exceeds the preload in the spring 16 (e.g., the cover is blocked, etc.), the wire 14 will instead further stretch the spring 16, thereby preserving the integrity of the actuator 14 (FIG. 1*a*).

In the present invention, the wire actuator 14 and spring 16 are cooperatively configured such that the maximum actuation force offered by the wire 14 is operable to transform the SMA of the spring 16 and then stretch the low modulus spring 16. That is to say, the assembly 10 may be configured such that transformation occurs at the inception of overload protection. Alternatively, the wire actuator 14 and spring 16 are cooperatively configured such that the maximum actuation force offered by the wire 14 is operable to stretch the Austenitic spring a predetermined length, transform the SMA of the spring 16 to its lower modulus state at the predetermined length, and then continue stretching the lower modulus spring 16. In other words, where the superelastic shape memory alloy member 16 presents an Austenitic to Martensitic phase transformation stress threshold, the threshold may be overcome by a transforming force not greater than the maximum actuation force, or not greater than the initial deformation required force. An exemplary predetermined length may equal a tenth, quarter, or half of the overall stroke.

The preferred protection device 12 provides mechanical advantage, and to that end, may further include a lever 20 intermediate the actuator 14 and spring 16 (FIG. 2). The lever 20 defines first and second arms 20*a,b* and a pivot axis. The actuator 14 is attached to one of the arms 20*a,b*, so as to be spaced from the axis a first distance. The spring 16 is attached to the other arm and spaced from the axis a second distance greater than the first, so as to increase the overload force required to stretch the spring 16, and thereby enable a smaller spring (or less resistive member) 16 to be used. Alternatively, the second distance may be less than the first, so as to reduce displacement and thereby enable a shorter spring 16 to be used.

In another embodiment, the resistive member 16 presents a bent planar body formed at least in part by superelastic shape memory alloy. The body 16 is resistively bendable preferably at its longitudinal center and presents an initial arcuate shape (FIG. 3). Alternatively, it is appreciated that the body may be resistively foldable along a fold line, preferably at its center, and present an initially angular shape (not shown). The body 16 presents a free end, and is buttressed at the opposite end. The actuator 14 is drivenly coupled to the free end of the body 16. For example, where the actuator 14 includes a shape memory wire, it is oriented so as to traverse the body 16 lengthwise from end to end, and is more preferably entrained through holes 16*a* defined near both ends of the planar body 16 (FIG. 3). A bead (or connector, washer, o-ring clip, etc.) 22 is fixedly connected to, or more preferably, defined by the distal end of the wire 14, and presents a diameter greater than the hole diameter, so as to prevent migration therethrough. The preferred bead 22 is thermally and electrically insulative, so as to isolate the body 16 and actuator 14, and thereby promote superelasticity. When the actuator 14 is activated and an overload condition exists, the bead 22 is pulled against the body 16 to impart a collapsing or bending force thereto.

In this configuration, the assembly 10 is configured such that transformation occurs at the inception of overload protection, since this is the point of maximum stress in the body 16. Next, the body 16 is continually bent or folded in its lower modulus state at an increasing rate. It is appreciated that the degree of curvature or bending is indirectly proportional to the amount of force necessary to continue bending. More particularly, the body 16 is stiffest or the least susceptible to bending in its initial geometric condition, due in part to the applied force vector, $F_v$, being closest to the appreciated pivot axis (FIG. 3). The vector spacing increases as the body 16 collapses, thereby reducing the force necessary to maintain the effective bending moment. Moreover, it is appreciated that as the radius of curvature of the arcuate body 16 reduces, or a fold line becomes more defined, the force and moment necessary for bending also reduces. Where the force is maintained, due to active material actuation, for example, the body 16 will be caused to bend or fold at an increasing rate. As a result, in this configuration, the force versus displacement profile decreases over the entire stroke, which likewise reduces the stress in the actuator 14.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. An overload protection device adapted for use with an actuator drivenly coupled to a load, defining a stroke, and presenting a maximum actuation force and structural capacity, said device comprising:
   a resistive member drivenly coupled to the actuator opposite the load, operable to be displaced over the stroke, presenting an initial deformation required force not greater than the maximum actuation force, and defining a non-linear force versus displacement relationship over the stroke, such that the member is caused to displace only when the required force is less than the load.

2. The device as claimed in claim 1, wherein the member is at least partially formed of a superelastic shape memory alloy having an Austenitic to Martensitic phase transformation stress threshold, and the threshold is overcome by a transforming force not greater than the maximum actuation force.

3. The device as claimed in claim 1, wherein the member is at least partially formed of a superelastic shape memory alloy having an Austenitic to Martensitic phase transformation stress threshold, and the threshold is overcome by a transforming force not greater than the initial deformation required force.

4. The device as claimed in claim 1, wherein the member is a spring.

5. The device as claimed in claim 1, wherein the member is a bent planar body.

6. The device as claimed in claim 1, further comprising:
   an insulating element operable to thermally and electrically isolate the member from the actuator.

7. An actuation assembly adapted for driving a load, and protecting against overload conditions, said device comprising:
   an actuator drivenly coupled to the load, defining a stroke, and presenting a maximum actuation force and structural capacity, a resistive member drivenly coupled to the actuator opposite the load, operable to be displaced over the stroke, presenting an initial deformation required force less than the maximum actuation force, and defining a non-linear force versus displacement relationship over the stroke, such that the member is caused to displace only when the required force is less than the load.

8. The assembly as claimed in claim 7, wherein the member is at least partially formed of a superelastic shape memory alloy having an Austenitic to Martensitic phase transformation stress threshold, and the threshold is overcome by a transforming force not greater than the maximum actuation force.

9. The assembly as claimed in claim 7, wherein the member is at least partially formed of a superelastic shape memory alloy having an Austenitic to Martensitic phase transformation stress threshold, and the threshold is overcome by a transforming force not greater than the initial deformation required force.

10. The assembly as claimed in claim 7, wherein the member is a spring.

11. The assembly as claimed in claim 7, wherein the member is a bent planar body.

12. The assembly as claimed in claim 7, wherein the actuator is an active material actuator.

13. The assembly as claimed in claim 12, wherein the active material actuator is formed of thermally activated shape memory alloy.

14. The assembly as claimed in claim 7, further comprising:
 an insulating element operable to thermally and electrically isolate the member from the actuator.

* * * * *